United States Patent
Beck et al.

(10) Patent No.: US 9,185,273 B2
(45) Date of Patent: Nov. 10, 2015

(54) IMAGING PIXELS WITH IMPROVED DYNAMIC RANGE

(71) Applicant: Semiconductor Components Industries, LLC, Phoenix, AZ (US)

(72) Inventors: Jeff Beck, Philomath, OR (US); William Gazeley, Corvallis, OR (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 161 days.

(21) Appl. No.: 14/015,548

(22) Filed: Aug. 30, 2013

(65) Prior Publication Data
US 2014/0078336 A1    Mar. 20, 2014

Related U.S. Application Data

(60) Provisional application No. 61/702,933, filed on Sep. 19, 2012.

(51) Int. Cl.
*H04N 5/225*   (2006.01)
*H04N 5/355*   (2011.01)
*H04N 5/3745*  (2011.01)

(52) U.S. Cl.
CPC .............. *H04N 5/225* (2013.01); *H04N 5/3559* (2013.01); *H04N 5/35572* (2013.01); *H04N 5/37452* (2013.01)

(58) Field of Classification Search
CPC ................ H01L 27/14609; H01L 27/14643; H01L 27/14856; H04N 5/3559; H04N 5/35581; H04N 5/374; H04N 3/155; H04N 5/353; H04N 5/35554; H04N 5/35563; H04N 5/355; H04N 5/2355; H04N 5/347
USPC ............................... 348/246, 222.1, 308, 296
See application file for complete search history.

(56) References Cited

U.S. PATENT DOCUMENTS

| | | | |
|---|---|---|---|
| 7,733,382 B2 | 6/2010 | Takayanagi | |
| 8,766,157 B2 | 7/2014 | Levine et al. | |
| 2011/0001711 A1* | 1/2011 | Choi et al. | 345/173 |
| 2011/0140182 A1* | 6/2011 | Tanaka | 257/292 |
| 2011/0141325 A1* | 6/2011 | Nakajima | 348/246 |
| 2012/0033118 A1* | 2/2012 | Lee et al. | 348/296 |
| 2012/0305750 A1* | 12/2012 | Barbier et al. | 250/208.1 |
| 2014/0103189 A1 | 4/2014 | Chen et al. | |

* cited by examiner

*Primary Examiner* — Twyler Haskins
*Assistant Examiner* — Padma Haliyur
(74) *Attorney, Agent, or Firm* — Treyz Law Group; Michael H. Lyons (57) ABSTRACT

An imager may include hybrid pixels that can be operated in first and second configurations. A hybrid pixel may include a floating diffusion region and first and second photodiodes that are coupled to the floating diffusion region. The second photodiode may be coupled to the floating diffusion region by a transfer gate. The first photodiode may accumulate charge during a first integration period, whereas the second photodiode may accumulate charge during a second integration period. The imager may operate the hybrid pixel for improved dynamic range by controlling the configuration of the hybrid pixel.

20 Claims, 5 Drawing Sheets

IMAGING PIXELS WITH IMPROVED DYNAMIC RANGE

This application claims the benefit of provisional patent application No. 61/702,933, filed Sep. 19, 2012 which is hereby incorporated by reference herein in its entirety.

BACKGROUND

This relates generally to imaging systems, and more particularly to imaging systems with high dynamic range.

Modern electronic devices such as cellular telephones, cameras, and computers often use digital image sensors. Imagers (i.e., image sensors) may be formed from a two-dimensional array of image sensing pixels. Each pixel receives incident photons (light) and converts the photons into electrical signals. Image sensors are sometimes designed to provide images to electronic devices using a Joint Photographic Experts Group (JPEG) format.

Pixels can be characterized by the maximum charge capacity relative to a noise floor (e.g., pixel noise that generates charge even when the pixel is exposed to minimal or no incident light). The ratio of the maximum amount of measurable light intensity or maximum charge capacity to the noise floor may sometimes be referred to as the dynamic range of a pixel. The dynamic range of each pixel is typically predetermined for conventional imagers. However, having a single predetermined dynamic range can result in poor performance for imaging conditions such as when incident light exceeds the maximum measurable light intensity or when the amount of incident light is less than the noise floor of the predetermined dynamic range.

DETAILED DESCRIPTION

Figure 1:
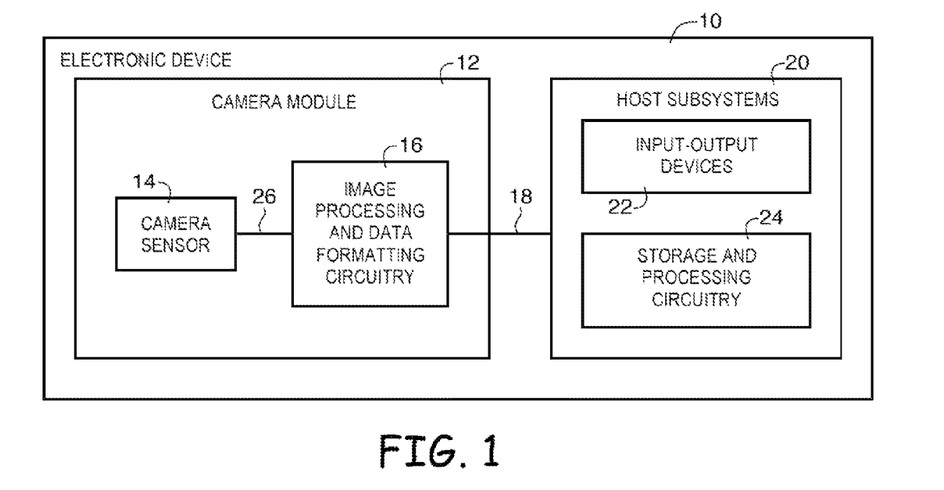
FIG. 1 is an illustrative schematic diagram of an electronic device with a camera sensor that may include pixels with improved dynamic range in accordance with an embodiment of the present invention.

Embodiments of the present invention relate to image sensors with high dynamic range. An electronic device with a digital camera module is shown in FIG. 1. Electronic device 10 may be a digital camera, a computer, a cellular telephone, a medical device, or other electronic device. Camera module 12 may include image sensor 14 and one or more lenses.

During operation, the lenses focus light onto image sensor 14. Image sensor 14 includes photosensitive elements (e.g., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from camera sensor 14 may be provided to image processing and data formatting circuitry 16 via path 26. Image processing and data formatting circuitry 16 may be used to perform image processing functions such as three-dimensional depth sensing, data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip (SOC) arrangement, camera sensor 14 and image processing and data formatting circuitry 16 are implemented on a common integrated circuit. The use of a single integrated circuit to implement camera sensor 14 and image processing and data formatting circuitry 16 can help to reduce costs.

Camera module 12 may convey acquired image data to host subsystems 20 over path 18 (e.g., image processing and data formatting circuitry 16 may convey image data to subsystems 20). Electronic device 10 typically provides a user with numerous high-level functions. In a computer or advanced cellular telephone, for example, a user may be provided with the ability to run user applications. To implement these functions, host subsystem 20 of electronic device 10 may include storage and processing circuitry 24 and input-output devices 22 such as keypads, input-output ports, joysticks, and displays. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, or other processing circuits.

Figure 2:
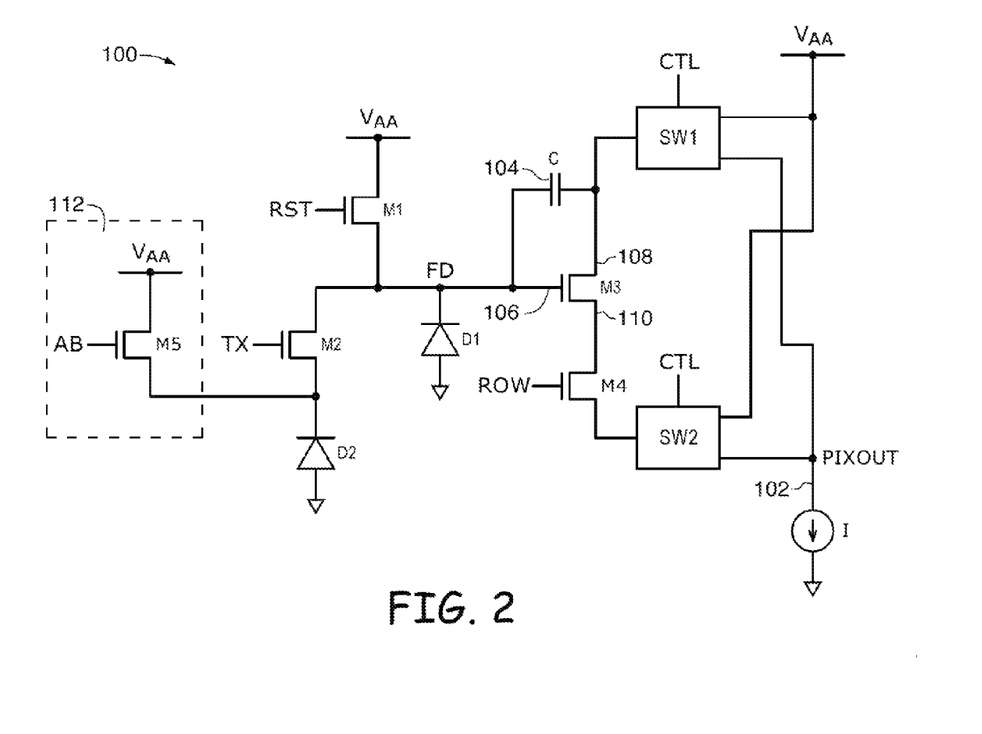
FIG. 2 is a diagram of an illustrative hybrid pixel having improved dynamic range in accordance with an embodiment of the present invention.

It may be desirable to provide image sensors with pixels having improved dynamic range characteristics. Such image sensors may be able to accommodate an increased range of imaging conditions with improved performance. FIG. 2 is a diagram of an illustrative pixel 100 that may be used in an imager such as imager 14 of FIG. 1. For example, imager 14 may include an array of pixels 100 arranged in rows and columns.

As shown in FIG. 2, pixel 100 may include a photodiode D2 that is coupled to a floating diffusion region FD by transfer gate M2 (e.g., a transistor pass gate) that is controlled by signal TX. Floating diffusion region FD may be coupled to pixel supply voltage VAA by reset transistor M1 that is controlled by reset signal RST. Floating diffusion region FD may be coupled to pixel column path 102 via transistor M3 that forms a source-follower amplifier and row select transistor M4 that is controlled by row select control signal ROW. Source-follower transistor M3 may have a gate terminal 106 and source-drain terminals 108 and 110 (e.g., each of terminals 108 and 110 may serve as either a source or a drain region for transistor M3). Gate terminal 106 may be coupled to floating diffusion region FD. Source-drain terminal 108 may be coupled to switch SW1, whereas source-drain terminal 110 may be coupled to switch SW2 (e.g., via transistor M4).

Pixel column path 102 may serve as a pixel output node shared by the pixels of a column of a pixel array (e.g., the output of each of the pixels of the column may be coupled to pixel column path 102). Column driver circuitry may supply bias current I to column path 102.

Pixel 100 may be operated in a so-called 3T configuration in which charge integrated by photodiode D1 over an integration period is transferred to floating diffusion region FD and subsequently sampled as pixel output signal PIXOUT. In the 3T configuration, transistors M1, M3, and M4 may be controlled to sample the charge from photodiode D1 without sampling charge from photodiode D2 (e.g., only three transistors are used in the 3T configuration). Switches SW1 and SW2 may be configured using control signal CTL to provide supply voltage VAA to transistor M3 and connect transistor M4 to pixel column path 102. In this configuration, the effective capacitance presented to the floating diffusion region is the combination (e.g., sum) of capacitance C of capacitor 104 and parasitic capacitances such as the gate capacitance of source-follower transistor M3. As an example, the parasitic capacitance may be 2 fF and capacitance C may be 8 fF. In this scenario, the effective capacitance may be 10 fF. This example is merely illustrative. Capacitance C may be any desired value such as between 5 fF and 10 fF, less than 5 fF, or greater than 10 fF. The parasitic capacitance may be dependent on the process technology used in fabricating pixel 100 and the design of pixel 100.

Pixel 100 may include photodiode D1 that is coupled to floating diffusion region FD. Photodiode D1 may store charge independently of photodiode D2. Photodiodes D1 and D2 may be characterized by different well capacities (i.e., the amount of charge that can be accumulated by each photodiode before saturation).

Pixel 100 may be operated in a so-called 4T configuration in which charge integrated by photodiode D2 over an integration period is sampled as pixel output signal PIXOUT. In the 4T configuration, transistors M1, M2, M3, and M4 may be controlled to sample the charge from photodiode D2. Switches SW1 and SW2 may be configured using control signal CTL to connect pixel column path 102 to transistor M3 and provide supply voltage VAA to transistor M4. In this configuration, the effective capacitance presented to the floating diffusion region may be the parasitic capacitance plus capacitance C times the difference between 1 and the gain of source-follower transistor M3. The gain of source-follower transistor M3 may be close to unity (e.g., 0.85) and therefore the contribution of capacitor 104 to the effective capacitance may be reduced relative to the 3T configuration (e.g., because 0.15° C. is less than C).

Pixel 100 may be characterized by a conversion gain metric, which may be defined as the change in voltage for each unit of charge accumulated by a photodiode. The conversion gain may be inversely proportional to the effective capacitance at floating diffusion region FD. For example, a large effective capacitance may result in a low conversion gain, whereas a small effective capacitance may result in a high conversion gain. The 4T pixel conversion gain may therefore be greater than the 3T pixel conversion gain, because the effective capacitance during 4T pixel operations is less than the effective capacitance during 3T pixel operations.

If desired, pixel 100 may be provided with optional circuitry 112. Anti-blooming transistor M5 may be provided with anti-blooming control signal AB that helps to prevent current leakage from photodiode D2 into an underlying integrated circuit substrate. For example, anti-blooming control signal AB may be set to a voltage equal to or substantially equal to the threshold voltage of transistor M5 so that transistor M5 is activated when the voltage across photodiode D2 is equal to or less than a power supply ground voltage.

The example of FIG. 2 in which signal CTL is provided to switches SW1 and SW2 is merely illustrative. If desired, switches SW1 and SW2 may be controlled by different control signals to selectively couple transistors M3 and M4 to a pixel supply terminal and a column output path.

Figure 3:
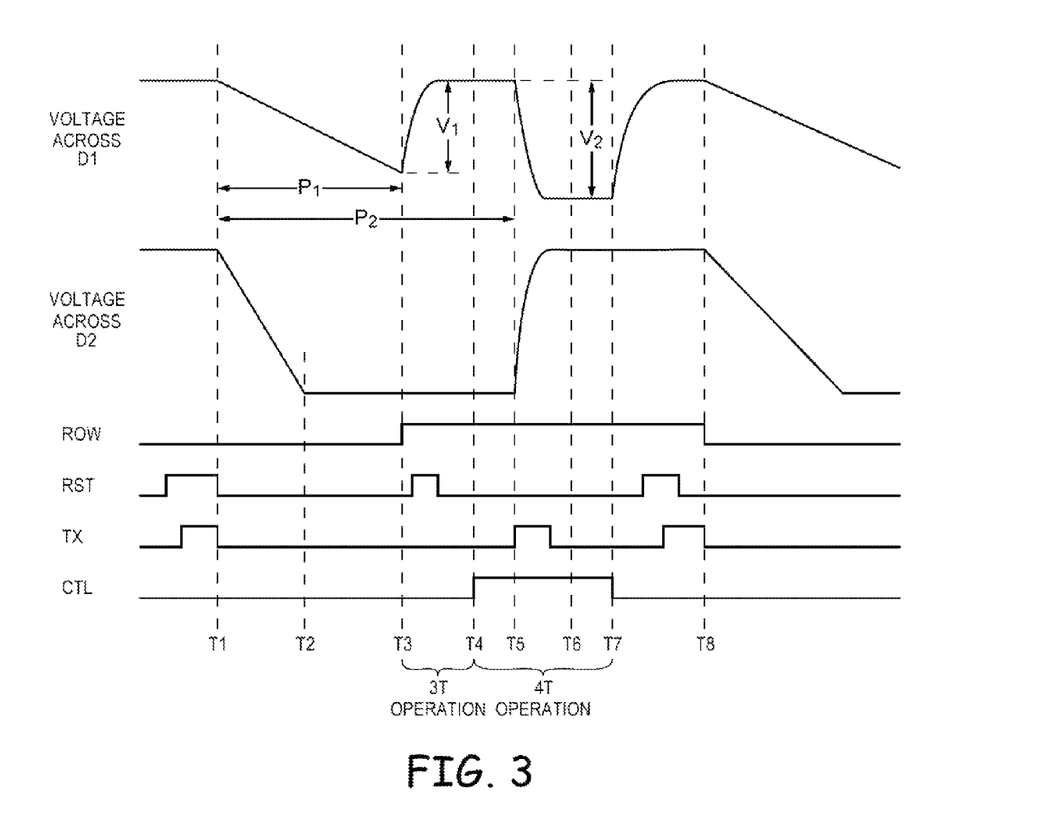
FIG. 3 is a timing diagram illustrating hybrid pixel operations during bright light conditions in accordance with an embodiment of the present invention.

Pixels such as pixel 100 that have multiple photodiodes and are operable in multiple configurations (e.g., 3T and 4T configurations) for reading out accumulated charge from the photodiodes may sometimes be referred to herein as hybrid pixels. Hybrid pixel 100 may be controlled during pixel readout operations to provide improved dynamic range based on imaging conditions. FIG. 3 is an illustrative timing diagram of the operations of hybrid pixel 100 during bright light conditions.

Prior to time T1, pixel reset operations may be performed to reset photodiodes D1 and D2 and floating diffusion region FD. Reset signal RST and control signal TX may be pulsed, which enables transistors M1 and M2 and resets the voltage at floating diffusion FD and photodiode D2 (e.g., to pixel supply voltage VAA). The pulses of reset signal RST and control signal TX may be sequential or may be overlapping (e.g., partially or completely).

At time T1, control signal TX may be de-asserted, which initiates integration operations at photodiodes D2. Reset signal RST may be de-asserted, which initiates integration operations at photodiode D1. The rate of change of voltage produced by photodiodes D1 and D2 may be inversely proportional to the capacitance presented at photodiodes D1 and D2 during integration periods and may be proportional to the level of incident light intensity. Photodiode D1 may be presented with a greater capacitance (e.g., capacitance C plus the parasitic capacitance at floating diffusion region FD) than photodiode D2, which is disconnected from floating diffusion region FD by disabled transistor M2 and is only presented with parasitic capacitances. The voltage across photodiode D1 therefore decreases at a reduced rate relative to the voltage across photodiode D2.

At time T2, photodiode D2 may saturate due to bright light conditions. Between times T2 and T3, photodiode D2 may be unable to accumulate additional charge due to saturation, whereas photodiode D1 may continue to accumulate charge.

Diode D1 may have an integration period of P1 that extends from times T1 to T3. Between times T3 and T4, 3T pixel operations may be performed in which switch control signal CTL has a first value (e.g., de-asserted) that configures switches SW1 and SW2 to supply voltage VAA to terminal 108 of transistor M3 and connect terminal 110 of transistor M3 to the pixel output (e.g., via transistor M4).

At time T3, row control signal ROW may be asserted and the voltage across diode D1 may be transferred to pixel column path 102 and sampled using circuitry such as analog-to-digital conversion (ADC) circuitry to produce an integrated charge sample. Subsequent to time T3, reset signal RST may be pulsed to reset the voltage at the floating diffusion region.

At time T4, the reset voltage value at the floating diffusion region may be sampled (e.g., using ADC circuitry). The 3T pixel output may be determined from the difference V1 between the reset voltage sample and integrated charge sample. Hybrid pixel 100 may be configured in a 4T configuration at time T4 by configuring switches SW1 and SW2 using control signal CTL having a second value (e.g., asserting control signal CTL) to connect terminal 108 of transistor M3 to pixel column path 102 and provide supply voltage VAA to terminal 110 of transistor M3 via transistor M4.

Between times T4 and T7, hybrid pixel 100 may be operated in the 4T configuration. At time T5 (or immediately prior to T5), a 4T reset sample may be taken. Subsequently, control signal TX may be asserted, which transfers the integrated charge of photodiode D2 to floating diffusion region FD. At subsequent time T6, the integrated charge may be sampled from the floating diffusion region FD. The difference in voltage V2 between the sampled integrated charge and the sampled reset value may represent the charge integrated by photodiode D2 during integration period P2 between times T1 and T5.

For the bright light conditions of FIG. 3, voltage V2 produced from photodiode D2 may fail to accurately represent incident light, because photodiode D2 is saturated at time T2. However, voltage V1 produced from photodiode D1 may accurately represent the incident light, because photodiode D1 did not saturate during integration period P1. Imager 100 may therefore use voltage V1 as the output of hybrid pixel 100 during bright light conditions in which photodiode D2 saturates during integration periods.

Figure 4:
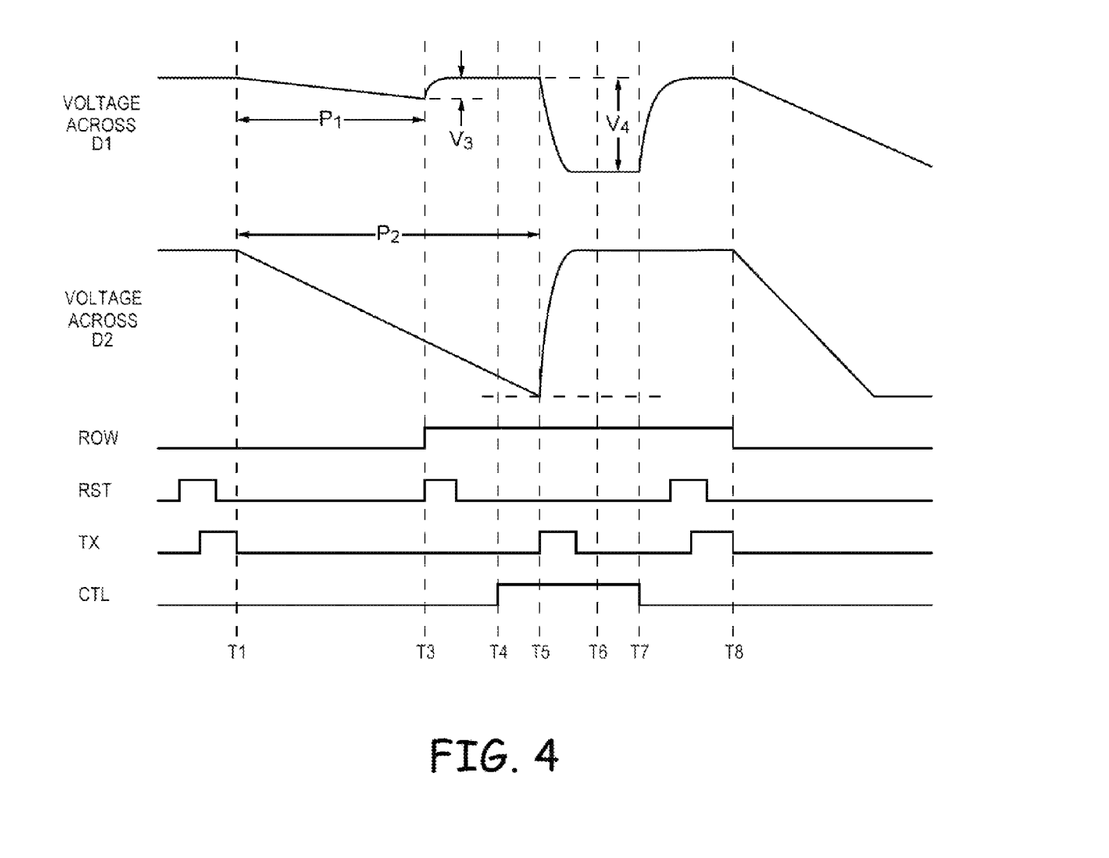
FIG. 4 is a timing diagram illustrating hybrid pixel operations during low light conditions in accordance with an embodiment of the present invention.

Voltage output of photodiode D2 may be used in scenarios such as low light scenarios, because the noise floor of 4T operations using photodiode D2 may be lower than the noise floor of 3T operations using photodiode D1 (e.g., the noise floor associated with using photodiode D2 may be less likely to exceed voltages generated from accumulated charge). FIG. 4 is an illustrative timing diagram of pixel operations performed in low light conditions.

As shown in FIG. 4, pixel reset operations may be performed before time T1 to initiate pixel integration of photodiode D1 and D2 at time T1. At times T3 and T4, 3T pixel operations may be performed (e.g., similarly to FIG. 3) to produce 3T voltage V3. However, the low light conditions of FIG. 4 may be insufficient to saturate photodiode D2. In other words, photodiode D2 may continue accumulating charge from time T1 to the completion of integration period P2 at time T5. At time T4, 4T operations may be initiated by adjusting the value of control signal CTL. Prior to time T5 (e.g. immediately prior to time T5), a 4T reset voltage of the floating diffusion region may be sampled. At time T5, the voltage across photodiode D2 may be transferred to the floating diffusion region by pulsing control signal TX and subsequently sampled at time T6. The difference V4 in voltage between the 4T reset voltage and the 4T accumulated charge sample may be used as a 4T pixel output signal.

Figure 5:
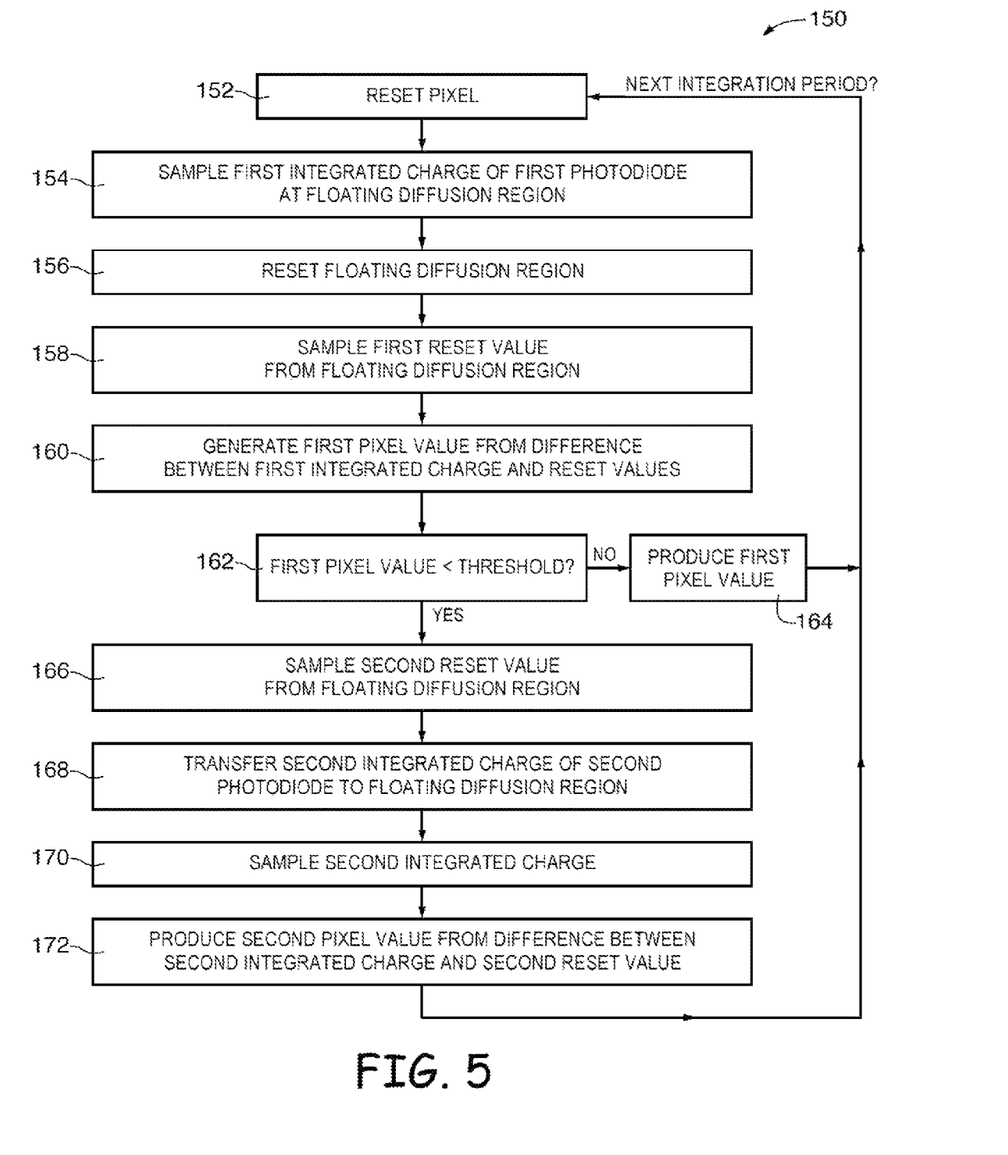
FIG. 5 is a flow chart of illustrative steps that may be performed using a hybrid pixel to provide improved dynamic range in accordance with an embodiment of the present invention.

Low light and bright light conditions may be differentiated based on the voltage produced using photodiode D1. For example, a 3T pixel sample produced using photodiode D1 may be used to determine whether low or bright light conditions exist for a given integration period. FIG. 5 is a flow chart 150 of illustrative steps that may be performed by an imager using a hybrid pixel such as pixel 100 of FIG. 2 to provide improved dynamic range.

During step 152, the imager may reset the pixel in preparation for light integration periods. For example, reset and control signals RST and TX may be pulsed prior to time T1 as shown in FIGS. 3 and 4.

During step 154, the imager may sample a first integrated charge of a first photodiode at the pixel floating diffusion region. For example, a first integrated charge may be sampled from photodiode D1 at or immediately prior to time T3 of FIGS. 3 and 4. The integrated charge may be sampled using sample-and-hold circuitry and analog-to-digital conversion circuitry.

During step 156, the imager may reset the floating diffusion region. For example, at time T3, the imager may pulse reset signal RST to reset the voltage at floating diffusion region FD.

During step 158, the imager may sample a first reset value from the floating diffusion region. For example, at time T4 of FIGS. 3 and 4, a reset value may be sampled.

During step 160, the imager may generate a first pixel value from the difference between the first integrated charge sample and the reset value sample. The first pixel value may represent the amount of charge accumulated by the first photodiode during a first integration period. Steps 154-160 may correspond to 3T operations in which voltage V1 is identified from charge accumulated by photodiode D1.

During step 162, the imager may determine whether the first pixel value (e.g., the 3T pixel value) is less than a threshold value. The threshold value may be determined based on the well capacity of photodiode D2. As an example, the threshold value may be equal to the sampled voltage across photodiode D1 at which the charge accumulated by photodiode D2 during integration period P1 exceeds the well capacity of photodiode D2 (e.g., photodiode D2 saturates). If the 3T pixel value is less than the threshold value (e.g., as shown in FIG. 4), photodiode D2 likely has not saturated due to low light conditions and 4T operations may be performed by processing step 166. If the 3T pixel value meets or exceeds the threshold value (e.g., as shown in FIG. 3), photodiode D2 likely has saturated due to bright light conditions and the imager may produce the 3T pixel value at step 164 as the output of the hybrid pixel. The process may then return to step 152 at the next integration period (e.g., to capture additional images).

During step 166, the imager may sample a second reset value from the floating diffusion region. For example, a reset value may be sampled at or immediately prior to time T5 of FIGS. 3 and 4.

During step 168, the imager may transfer a second integrated charge of a second photodiode to the floating diffusion region. For example, the imager may assert signal TX so that transistor M2 of FIG. 2 transfers integrated charge from photodiode D2 to floating diffusion region FD at time T5 of FIGS. 3 and 4.

During step 170, the imager may sample the second integrated charge. For example, the imager may sample the second integrated charge from column path 102 of FIG. 2 using sampling circuitry.

During step 172, the imager may produce a second pixel value from the difference between the second integrated charge and the second reset value. The second pixel value may be referred to as the 4T pixel value and may be used as the output of the hybrid pixel. The process may subsequently return to step 152 to produce additional pixel values during subsequent integration periods.

Figure 6:
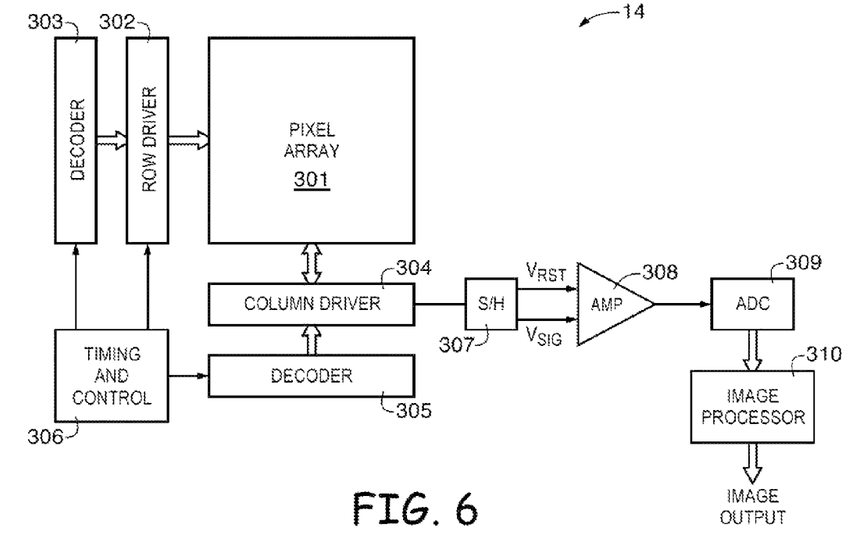
FIG. 6 is a block diagram of an imager employing hybrid pixels in accordance with an embodiment of the present invention.

FIG. 6 illustrates a simplified block diagram of an imager 14, for example a CMOS imager, employing a pixel array 301 having hybrid pixels. Pixel array 301 includes a plurality of hybrid pixels arranged in a predetermined number of columns and rows. The row lines are selectively activated by the row driver 302 in response to row address decoder 303 and the column select lines are selectively activated by the column driver 304 in response to column address decoder 305. Thus, a row and column address is provided for each pixel.

Imager 14 is operated by a timing and control circuit 306, which controls decoders 303 and 305 for selecting the appropriate row and column lines for pixel readout, and row and column driver circuitry 302, 304, which apply driving voltages to the drive transistors of the selected row and column lines. Timing and control circuitry 306 may, for example, control the drive transistors to produce control signals such as RST, TX, ROW, and CTL for hybrid pixels during the operations of flow chart 150 of FIG. 5. The pixel signals, which typically include a pixel reset signal Vrst and a pixel image signal Vsig for each pixel (or each photosensitive region of each pixel) are sampled by sample and hold circuitry 307 associated with the column driver 304. For example, pixel image signal Vsig may be produced from photodiode D1 or photodiode D2 of the hybrid pixels (e.g., selected from first and second pixel signals of the photodiodes). A differential signal Vrst−Vsig is produced for each pixel (or each photosensitive area of each pixel), which is amplified by an amplifier 308 and digitized by analog-to-digital converter 309. The analog to digital converter 309 converts the analog pixel signals to digital signals, which are fed to an image processor 310 which forms a digital image. Image processor 310 may, for example, be provided as part of image processing and data formatting circuitry 16 of FIG. 1. Imager 14 may determine which photodiode (e.g., D1 or D2) of each hybrid pixel is used in producing the differential signal for each hybrid pixel.

Figure 7:
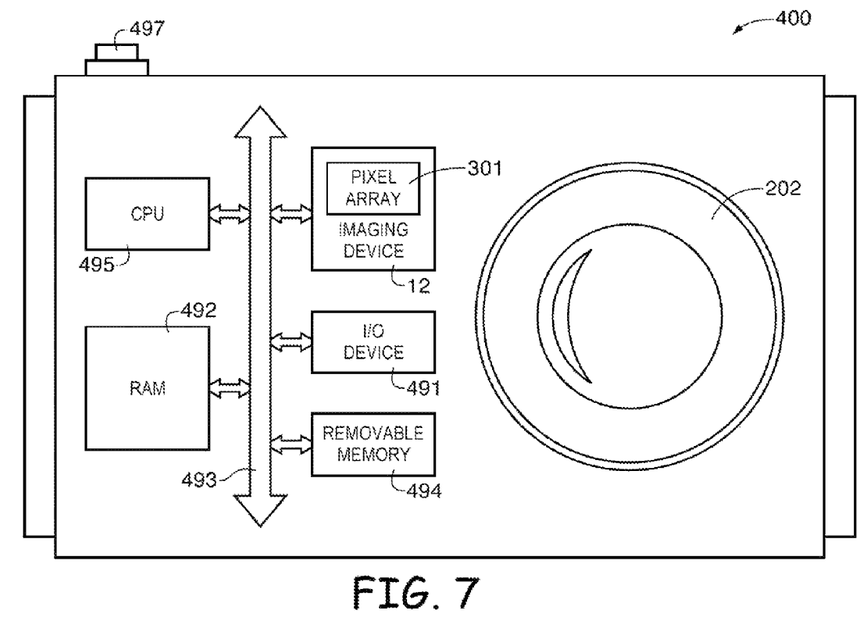
FIG. 7 is a block diagram of a processor system employing the imager of FIG. 6 in accordance with an embodiment of the present invention.

FIG. 7 is a simplified diagram of an illustrative processor system 400, such as a digital camera, which includes an imaging device 12 (e.g., the camera module of FIG. 1) employing an imager having hybrid pixels as described above. The processor system 400 is exemplary of a system having digital circuits that could include imaging device 12. Without being limiting, such a system could include a computer system, still or video camera system, scanner, machine vision system, vehicle navigation system, video phone, surveillance system, auto focus system, star tracker system, motion detection system, image stabilization system, and other systems employing an imaging device.

Processor system 400, for example a digital still or video camera system, generally includes a lens 202 for focusing an image on pixel array 301 when a shutter release button 497 is pressed, central processing unit (CPU) 495, such as a microprocessor which controls camera and one or more image flow functions, which communicates with one or more input/output (I/O) devices 491 over a bus 493. Imaging device 12 also communicates with CPU 495 over bus 493. System 400 also includes random access memory (RAM) 492 and can optionally include removable memory 494, such as flash memory, which also communicates with CPU 495 over the bus 493. Imaging device 12 may be combined with the CPU, with or without memory storage on a single integrated circuit or on a different chip. Although bus 493 is illustrated as a single bus, it may be one or more busses, bridges or other communication paths used to interconnect system components of system 400.

Various embodiments have been described illustrating imagers with hybrid pixels.

An imager may include hybrid pixels that can be operated in first and second configurations. A hybrid pixel may include a floating diffusion region and first and second photodiodes that are coupled to the floating diffusion region. The second photodiode may be coupled to the floating diffusion region by a transfer gate. The first photodiode may accumulate charge during a first integration period, whereas the second photodiode may accumulate charge during a second integration period. The first and second integration periods may overlap.

The hybrid pixel may include a source-follower transistor having a gate that is coupled to the floating diffusion region and first and second source-drain terminals. A capacitor may be coupled between the gate and the first source-drain terminal. A first switch may be coupled to the first source-drain terminal, whereas a second switch may be coupled to the second source-drain terminal. The first and second switches may each selectively couple the respective source-drain terminal to either a pixel output terminal or a pixel supply voltage terminal.

In the first configuration of the hybrid pixel, the first switch may couple the first source-drain terminal to the pixel supply voltage terminal, whereas the second switch may couple the second source-drain terminal to the pixel output terminal. Control circuitry may perform three-transistor (3T) operations to produce accumulated charge of the first photodiode at the pixel output terminal using a reset transistor, a source-follower transistor, and a row access transistor.

In the second configuration of the hybrid pixel, the first switch may couple the first source-drain terminal to the pixel output terminal, whereas the second switch may couple the second source-drain terminal to the pixel supply voltage terminal. Control circuitry may perform four-transistor (4T) operations to produce accumulated charge of the second photodiode at the pixel output terminal using the reset transistor, the source-follower transistor, the row access transistor, and the transfer gate.

The control circuitry may operate the hybrid pixel in the first configuration to produce a first pixel signal from the first photodiode. The control circuitry may determine whether the first pixel signal is less than a threshold. In response to determining that the first pixel signal exceeds the threshold, the control circuitry may select the first pixel signal as the output of the hybrid pixel. In response to determining that the first pixel signal is less than the threshold, the control circuitry may operate the pixel in the second configuration to produce a second pixel signal that is used as the output of the hybrid pixel. If desired, the control circuitry may operate the pixel in the second configuration regardless of threshold comparison results and select from the first and second pixel signals based on the threshold results.

The foregoing is merely illustrative of the principles of this invention and various modifications can be made by those skilled in the art without departing from the scope and spirit of the invention.

What is claimed is:

1. A hybrid imaging pixel comprising:
 a floating diffusion region;
 a transistor coupled to the floating diffusion region;
 a switch that has a first configuration that couples the transistor to a supply voltage of the hybrid imaging pixel and that has a second configuration that couples the transistor to an output line of the hybrid imaging pixel;
 a first photodiode that is coupled to the floating diffusion region, wherein the first photodiode accumulates charge during a first integration period;
 a transfer gate that is coupled to the floating diffusion region; and
 a second photodiode that is coupled to the floating diffusion region by the transfer gate, wherein the second photodiode accumulates charge during a second integration period.

2. The hybrid imaging pixel defined in claim 1, wherein the transistor comprises a source-follower transistor having a gate that is coupled to the floating diffusion region and having first and second source-drain terminals, the hybrid imaging pixel further comprising:
 a capacitor that is coupled between the gate of the source-follower transistor and the first source-drain terminal of the source-follower transistor.

3. The hybrid imaging pixel defined in claim 2, wherein the switch comprises a first switch that is coupled to the first source-drain terminal of the source-follower transistor and that couples the first source-drain terminal to a pixel supply voltage terminal in the first configuration and to a pixel output in the second configuration, the hybrid imaging pixel further comprising:
a second switch that is coupled to the second source-drain terminal of the source-follower transistor and couples the second source-drain terminal to the pixel supply voltage terminal when the first switch is in the second configuration and to the pixel output when the first switch is in the first configuration.

4. The hybrid imaging pixel defined in claim 3 further comprising:
a row access transistor that is coupled between the source-follower transistor and the second switch.

5. The hybrid imaging pixel defined in claim 4 further comprising:
a reset transistor coupled between the pixel supply voltage terminal and the floating diffusion region.

6. The hybrid imaging pixel defined in claim 5 wherein the hybrid imaging pixel is operable in a first configuration in which the accumulated charge of the first photodiode is produced at the pixel output and wherein the hybrid imaging pixel is operable in a second configuration in which the accumulated charge of the second photodiode is produced at the pixel output.

7. The hybrid imaging pixel defined in claim 6 wherein the first switch couples the first source-drain terminal to the pixel supply voltage terminal and the second switch couples the second source-drain terminal to the pixel output in the first configuration.

8. The hybrid imaging pixel defined in claim 7 wherein the first switch couples the first source-drain terminal to the pixel output and the second switch couples the second source-drain terminal to the pixel supply voltage terminal in the second configuration.

9. A method of operating an imager having at least one pixel, the method comprising:
operating the pixel in a first configuration in which a first pixel signal is produced from a first photodiode of the pixel by sampling a first signal based on a first voltage across the first photodiode;
determining whether the first pixel signal is less than a threshold; and
in response to determining that the first pixel signal is less than the threshold, operating the pixel in a second configuration in which a second pixel signal is produced from a second photodiode of the pixel by sampling a second signal based on a second voltage across the first photodiode.

10. The method defined in claim 9 wherein operating the pixel in the second configuration comprises:
with a transfer gate, transferring accumulated charge from the second photodiode to a floating diffusion region of the pixel; and
sampling the accumulated charge of the second photodiode from the floating diffusion region.

11. The method defined in claim 10 wherein operating the pixel in the first configuration comprises:
sampling accumulated charge from the first photodiode from the floating diffusion region while isolating the accumulated charge of the second photodiode from the floating diffusion region using the transfer gate.

12. The method defined in claim 10 wherein the pixel includes a source-follower transistor having a gate terminal that is coupled to the floating diffusion region, a first source-drain terminal that is coupled to a first switch, and a second source-drain terminal that is coupled to a second switch, and wherein operating the pixel in the first configuration further comprises:
configuring the first switch to route a pixel supply signal to the first source-drain terminal of the source-follower transistor; and
configuring the second switch to couple the second source-drain terminal of the source-follower transistor to a pixel output.

13. The method defined in claim 12 wherein operating the pixel in the second configuration further comprises:
configuring the first switch to couple the first source-drain terminal of the source-follower transistor to the pixel output; and
configuring the second switch to route the pixel supply signal to the second source-drain terminal of the source-follower transistor.

14. The method defined in claim 9 further comprising:
in response to determining that the first pixel signal exceeds the threshold, selecting the first pixel signal for the pixel; and
in response to determining that the first pixel signal is less than the threshold, selecting the second pixel signal for the pixel.

15. A system, comprising:
a central processing unit;
memory;
input-output circuitry; and
an imaging device, wherein the imaging device comprises:
a pixel array;
a lens that focuses an image on the pixel array, wherein the pixel array comprises:
at least one hybrid pixel having a first configuration in which a pixel output signal is produced from only a first photodiode and a second configuration in which the pixel output signal is produced from a second photodiode based on a voltage across the first photodiode.

16. The system defined in claim 15 wherein the hybrid pixel comprises:
a floating diffusion region; and
first and second photodiodes coupled to the floating diffusion region.

17. The system defined in claim 16 wherein the hybrid pixel further comprises:
a transfer gate that is coupled between the second photodiode and the floating diffusion region; and
a reset transistor that is coupled to the floating diffusion region.

18. The system defined in claim 17 wherein the hybrid pixel further comprises:
a source-follower transistor having first and second source-drain terminals and a gate terminal that is coupled to the floating diffusion region; and
a capacitor that is coupled between the gate terminal and the first source-drain terminal of the source-follower transistor.

19. The system defined in claim 18 wherein the hybrid pixel further comprises:
a first switch coupled to the first source-drain terminal; and
a second switch coupled to the second source-drain terminal, wherein the first switch is configured to couple the first source-drain terminal to a pixel supply voltage terminal and the second switch is configured to couple the second source-drain terminal to a pixel output terminal in the first configuration, and wherein the first switch is configured to couple the first source-drain terminal to the pixel output terminal and the second switch is configured to couple to the second source-drain terminal to the pixel supply voltage terminal in the second configuration.

20. The system defined in claim 15 wherein imaging device further comprises:
   control circuitry that performs three-transistor (3T) operations using the hybrid pixel in the first configuration and performs four-transistor (4T) operations using the hybrid pixel in the second configuration.

* * * * *